United States Patent

Shults et al.

[15] 3,642,500
[45] Feb. 15, 1972

[54] PROCESS FOR STABILIZING STRUCTURE OF GROUND MEAT

[72] Inventors: Gary W. Shults, Milford; Eugen Wierbicki, Framingham, both of Mass.

[73] Assignee: The United States of America as represented by the Secretary of the Army

[22] Filed: July 17, 1969

[21] Appl. No.: 842,703

[52] U.S. Cl. .................................................99/108, 99/157
[51] Int. Cl. .......................................A22c 18/00, A23b 1/00
[58] Field of Search....................99/108, 109, 159, 174, 217, 99/221, 157

[56] References Cited

UNITED STATES PATENTS

| | | | |
|---|---|---|---|
| 2,456,909 | 12/1948 | Brasch | 99/221 X |
| 2,513,094 | 6/1950 | Hall | 99/159 |
| 3,483,005 | 12/1969 | Urbain et al. | 99/217 |
| 3,076,713 | 2/1963 | Maas | 99/159 X |
| 3,554,773 | 1/1971 | Shults et al. | 99/217 |

*Primary Examiner*—Hyman Lord
*Attorney*—Harry M. Saragovitz, Edward J. Kelly, Herbert Berl and Lawrence E. Labadini

[57] ABSTRACT

Stabilization of the structure of shaped, cooked, ground meat which is to be sterilized with high energy ionizing radiation is accomplished by incorporating within raw, ground meat from 0.5 percent to 1.5 percent by weight of sodium chloride and from 0.25 to 1.0 percent by weight of a food grade phosphate.

5 Claims, No Drawings

PROCESS FOR STABILIZING STRUCTURE OF GROUND MEAT

The invention described herein may be manufactured, used and licensed by or for the Government for governmental purposes without the payment to us of any royalty thereon.

This invention relates to a process for stabilizing the structure of shaped ground meat which is cooked and then sterilized with high energy ionizing radiation.

In connection with the sterilization of ground meat items with high energy ionizing radiation, it has been observed that the irradiated ground meat product loses its natural cohesive properties and crumbles into small fragments. While shaped ground meat products, especially patties, are widely accepted food items, it is obvious that if such products fall apart rather than remain intact, consumer appeal will diminish. Sterilization of ground meat with high energy ionizing radiation is preferable to thermal sterilization since the resulting product does not have that characteristically overcooked quality of thermally processed meat. In view of the failure of the ground meat item to hold together when subjected to a sterilizing does of ionizing radiation, attempts have been made to incorporate binders which would compensate for the loss of the natural binding properties of the meat. The common binders used in connection with meat products are starch or protein binders obtained from cereal products, such as soy protein, corn starch, potato starch, etc. The addition of cereal binders to ground meat is a decided disadvantage when the meat is processed with high energy ionizing radiation, since such binders cause discoloration, off-odors and irradiation flavors.

We have discovered that by incorporating sodium chloride and a food grade phosphate into the ground meat, the shape structure will be maintained following exposure to a sterilizing dose of high energy ionizing radiation and that the organoleptic properties of the ground meat will not suffer as in the case of the cereal binders. Sodium chloride is added to the ground meat in an amount which ranges from 0.5 percent to 1.5 percent by weight based on the weight of the meat. Among the food grade phosphates which may be used are sodium tripolyphosphate, sodium hexametaphosphate, tetrasodium pyrophosphate and mixtures of the foregoing phosphates such as a mixture of sodium hexametaphosphate (67 percent) and sodium tripolyphosphate (33 percent). The food grade phosphate is added in an amount which varies within the range of 0.25 percent to 1.0 percent by weight based on the weight of the meat. The salt and the phosphate may be added separately or may be mixed together and then incorporated in the ground meat. It is essential, however, that both the salt and the phosphate be added to the ground meat while in its raw state and that the additives be as uniformly distributed within meat as is possible.

Any grade of beef or any other kind of meat, e.g., pork, lamb, veal, poultry, may be employed in the practice of this invention. Grinding of the meat is accomplished by conventional means known in the art, and the degree of fineness of the grind will depend in part on the preference of the user and the type of food item. We normally use ½ inch and 3/16 inch grinding plates. After grinding, the salt and phosphate are added and thoroughly blended with the ground meat which is then shaped into the desired form such as patties, ground meat rolls, meat balls, etc. The shaped, ground meat product is then cooked to develop the characteristic flavor of cooked meat and also to inactivate the proteolytic enzymes present. To inactivate such enzymes, it is necessary to bring the internal temperature of the product within the temperature range of 65° to 85° C. and preferably to 70° C. Cooking is accomplished by oven baking, grilling or deep fat frying. Following the cooking step, the product is packaged under vacuum in a suitable rigid or flexible container.

Sterilization of the vacuum packed product is performed at temperatures below 0° C. and preferable within the range of −30° to −80° C. Sterilization is accomplished by exposing the foodstuff to a sterilizing dose of high energy ionizing radiation having energy levels that range from 750,000 electron volts to about 10,000,000 electron volts. The types of ionizing radiation that may be used are known in the art and may include, for example, electron beams, gamma rays, x-rays. It is preferred that the energy level of the ionizing radiation be less than 12,000,000 electron volts in order to avoid any possibility of inducing radioactivity in the food items treated. Sterilization of food stuffs requires dosages of ionizing radiation in the range of approximately 2.0 to about 6.0 megarads. Rad is a unit of absorbed dose of ionizing radiation equal to an energy of 100 ergs per gram of irradiated material.

Irradiation of the food items in the following examples was accomplished by exposing the items to gamma radiation from a 900,000 curie Cobalt 60 source. The physical arrangement of the source consisted of two spaced-apart parallel plaques which contain the radioisotope. Samples are carried by a conveyor between the plaques for an interval of time necessary to reach the desired dosage level.

Our invention will be described in more detail in connection with the following example setting forth the process for preparing an irradiated, shelf-stable, cooked, ground beef pattie.

EXAMPLE I

Beef round muscle, U.S. choice grade, 7 days after slaughter, was cut into chunks which were then fed into a commercial meat grinder having a 3/16 inch grinding plate. The ground beef was reground through the same machine. After grinding, 1 percent by weight of food grade sodium chloride and 0.5 percent by weight of food grade sodium tripolyphosphate were added to and completely mixed into the raw ground beef. The ground beef was then formed into circular patties, approximately 4 oz. in weight which were placed on cooking pans and inserted in an oven, heated to 350°–400° F., and cooked for 4 minutes on one side and 2 minutes on the other side which was sufficient to bring the internal temperature of the pattie to 70° C. Six cooked patties are stacked within a cylindrical metal container and sealed under 25 inches of vacuum. The sealed containers are transferred to the radiation source and the temperature of the contents of the containers brought down to −80° C. in a cold box. The containers, while held at −80° C. are then subjected to 4.5–5.6 megarads of high energy ionizing radiation in the form of gamma rays from 900,000 curie Cobalt 60 source.

A duplicate set of samples were prepared as in the previous paragraph, except that the sodium chloride and sodium tripolyphosphate were not added to the meat. Eight containers containers containing six patties each, were compared with a similar number of patties prepared according to this invention. A visual examination of the samples indicated that the patties prepared with the combination of NaCl and Na Tpp were firm and intact with no crumbling whereas the samples prepared without the additives of this invention, had crumbled to such an extent that they were virtually unrecognizable as patties.

We claim:

1. A process for stabilizing the structure of shaped ground meat which is cooked and then sterilized with high energy ionizing radiation which comprises in sequence the steps of
   a. uniformly incorporating within raw ground meat from 0.5 percent to 1.5 percent by weight of sodium chloride and from 0.25 percent to 1.0 percent by weight of a food grade phosphate,
   b. forming the raw ground meat into the desired shape,
   c. cooking the shaped ground meat to an internal temperature of from 65° C. to 85° C. to inactivate the proteolytic enzymes and develop the characteristic flavor of cooked meat,
   d. packaging said cooked, shaped ground meat under vacuum, and
   e. sterilizing the cooked, shaped ground meat by means of high energy ionizing radiation within the dosage range of from 2.0 to 6.0 megarads, while said meat is maintained at a temperature below 0° C.

2. Process according to claim 1 wherein the food grade phosphate is selected from the group consisting of sodium tripolyphosphate, sodium hexametaphosphate, tetrasodium pyrophosphate and mixtures thereof.

3. Process according to claim 2 wherein the ground meat is beef.

4. Process according to claim 3 wherein 0.5 percent by weight of the food grade phosphate and 1.5 percent by weight of sodium chloride is added to the ground beef.

5. Process according to claim 4 wherein the food grade phosphate is tetrasodium pyrophosphate.

* * * * *

UNITED STATES PATENT OFFICE
CERTIFICATE OF CORRECTION

Patent No. 3,642,500                     Dated February 15, 1972

Inventor(s)    Gary W. Shults et al.

It is certified that error appears in the above-identified patent
and that said Letters Patent are hereby corrected as shown below:

The term of this patent subesquent

January 21, 1988, has been disclaimed.

Signed and sealed this 13th day of May 1975.

(SEAL)
Attest:

RUTH C. MASON
Attesting Officer

C. MARSHALL DANN
Commissioner of Patents
and Trademarks